United States Patent
Kiem et al.

(10) Patent No.: US 6,752,607 B2
(45) Date of Patent: Jun. 22, 2004

(54) APPARATUS FOR REDUCING FRICTION LOSS IN SCROLL COMPRESSOR

(75) Inventors: Myung-Kyun K. Kiem, Incheon (KR); Song Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/360,718

(22) Filed: Feb. 10, 2003

(65) Prior Publication Data

US 2003/0152472 A1 Aug. 14, 2003

(30) Foreign Application Priority Data

Feb. 9, 2002 (KR) .................................. 10-2002-0007773

(51) Int. Cl.[7] .............................................. F04C 18/00
(52) U.S. Cl. ...................... 418/55.5; 418/57; 418/55.1
(58) Field of Search .................. 418/55.5, 57, 55.1; 184/6.18

(56) References Cited

U.S. PATENT DOCUMENTS 5,496,158 A * 3/1996 Barito et al. ............... 418/55.5
6,012,911 A * 1/2000 Hirooka et al. ............. 418/55.5

FOREIGN PATENT DOCUMENTS

| JP | 55035153 A | * 3/1980 | ............ F04C/18/02 |
| JP | 03074588 A | * 3/1991 | ............ F04C/18/02 |
| JP | 06058282 A | * 3/1994 | ............ F04C/29/02 |

* cited by examiner

*Primary Examiner*—Thomas Denion
*Assistant Examiner*—Theresa Trieu
(74) *Attorney, Agent, or Firm*—Greenblum & Bernstein, P.L.C.

(57) ABSTRACT

The present invention provides an apparatus that reduces friction loss in a scroll compressor including a floating ring member inserted in an insertion recess of a hub formed on a lower part of an orbiting scroll to be rotated and revolved, and a slide bush which is fixed on an eccentric portion of a rotary shaft and is inserted in a center of the floating ring member in order to minimize friction loss and component abrasion generated during transmitting rotating force of a driving motor to the orbiting scroll. Therefore, in the present invention, the worn components can be replaced easily.

22 Claims, 5 Drawing Sheets

APPARATUS FOR REDUCING FRICTION LOSS IN SCROLL COMPRESSOR

RELATED APPLICATION

The present disclosure relates to subject matter contained in priority Korean Application No. 2002-0007773, filed Feb. 9, 2002, which is herein expressly incorporated by reference in its entirety.

BACKGROUND OF THE INVENTION

1. Field of the Invention

The present invention relates to an apparatus for reducing a friction loss in a scroll compressor, and particularly, to an apparatus for reducing friction loss in a scroll compressor which is able to minimize the friction loss which is generated during transmitting a rotating force of a driving motor to an orbiting scroll.

2. Description of the Background Art

Generally, a compressor is a device for changing mechanical energy into latent energy of a fluid. There are various types of compressors, such as reciprocating type, scroll type, centrifugal type and vane types of compressor.

Among those types, the scroll type compressor has a structure in which gas is sucked in, compressed and discharged using a rotating body as in the centrifugal or vane type, unlike the reciprocating type that uses linear reciprocating movements of a piston.

FIG. 1 is a longitudinal cross-sectional view showing a part of a conventional scroll compressor.

As shown therein, the conventional scroll compressor includes a driving motor 3 installed in a case 1, a rotary shaft 4 coupled to a center part of the driving motor 3 so as to transmit rotating force of the driving motor 3, an orbiting scroll 5 installed on an upper part of the rotary shaft 4 so as to be rotated eccentrically and having a wrap 5a of an involute curve shape on an upper part thereof, a fixed scroll 6 coupled to the orbiting scroll 5 and having a wrap 6a of an involute curve shape so as to form a plurality of compression spaces (P) therein, and an Oldham ring 7 located between a main frame 2 and the orbiting scroll 5 to prevent the orbiting scroll 5 from rotating.

A hub 8 is formed on a lower surface of the orbiting scroll 5, and a fixing bush 9 is press-fitted into an insertion recess 8a of the hub 8.

A slide bush 10 is fixed on an eccentric portion 4a of the rotary shaft 4, and the eccentric portion 4a on which the slide bush 10 is fixed is inserted in the fixing bush 9.

Hereinafter, operations of the conventional scroll compressor constructed as above will be described as follows.

First, when an electric power is applied to the driving motor 3, the driving motor 3 rotates the rotary shaft 4, and at that time, the orbiting scroll 5 coupled to the eccentric portion 4a of the rotary shaft 4 is rotated as much as the eccentric distance.

At that time, the rotary shaft 4 rotates, and the hub 8 of the orbiting scroll 5 orbits, and the slide bush 10 fixed on the eccentric portion 4a is slid along with an inner diameter of the fixing bush 9.

A plurality of compression spaces P formed between the wrap 5a of the orbiting scroll 5 and the wrap 6a of the fixed scroll 6 are moved gradually toward the center of the fixed scroll by the repeated orbiting movements of the orbiting scroll 5, and the volume of the compression spaces is reduced.

Gas on a suction side is sucked into the compression spaces P by the continuous volume reducing of the compression spaces P, and the sucked gas is discharged to the discharge side.

However, in the conventional art, the slide bush is directly contacted to the fixing bush, and thereby the rotating force of the rotary shaft is directly transmitted to the orbiting scroll. And at that time, the frictional force between the fixing bush and the slide bush is increased and abrasion between them is increased, and thereby, the friction loss is increased and life span of the components is reduced.

Also, because the fixing bush is press-fitted into the hub in the conventional art, it is difficult to change the worn fixing bush.

SUMMARY OF THE INVENTION

Therefore, an object of the present invention is to provide an apparatus for reducing friction loss of a scroll compressor which is able to minimize the friction loss and component abrasion generated while transmitting rotating force of a driving motor to an orbiting scroll, and to enable replacement of worn components easily.

To achieve the object of the present invention, as embodied and broadly described herein, there is provided an apparatus for reducing friction loss of a scroll compressor comprising a floating ring member inserted into an insertion recess of a hub formed on lower part of an orbiting scroll to rotate and revolve, and a slide bush which is fixed on an eccentric portion of a rotary shaft and which is inserted in a center of the floating ring member.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
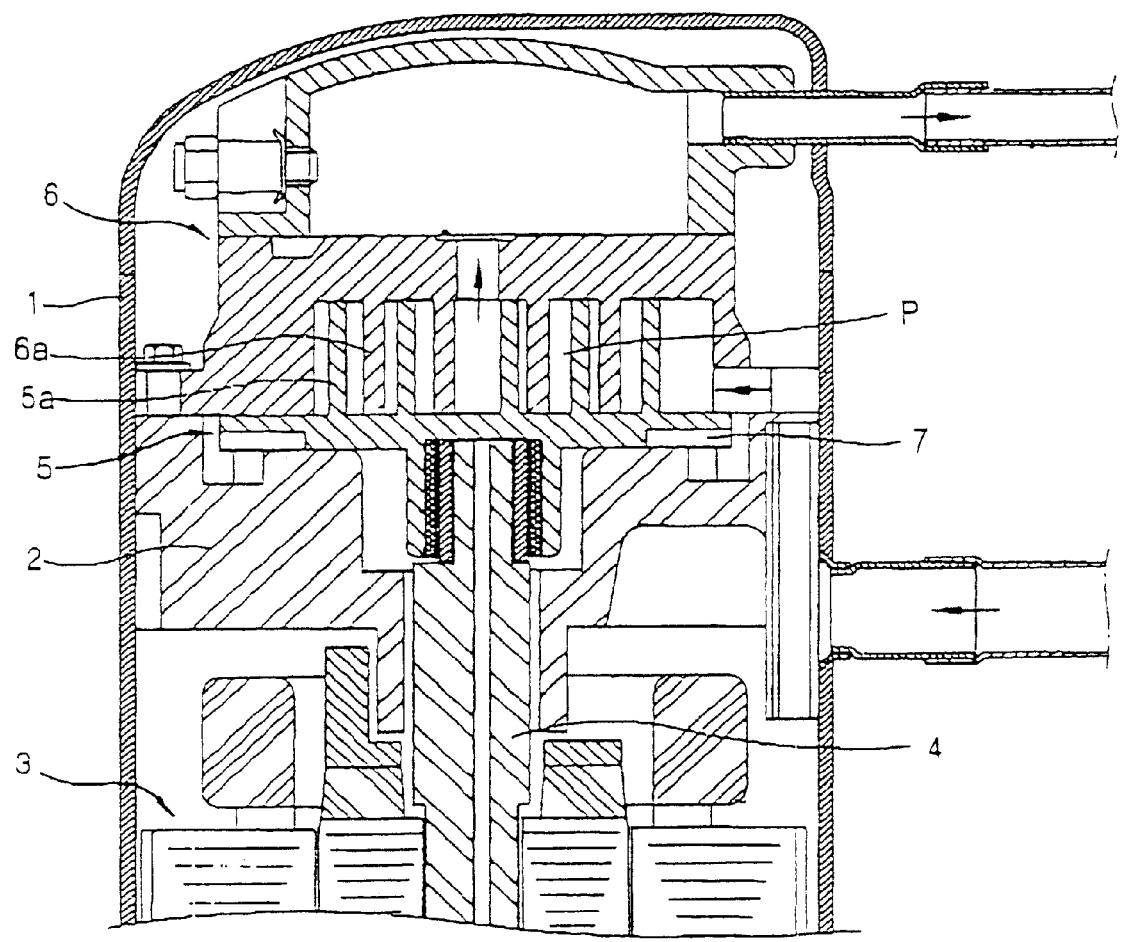
FIG. 1 is a longitudinal cross-sectional view showing an inner part of a conventional scroll compressor.
Figure 2:
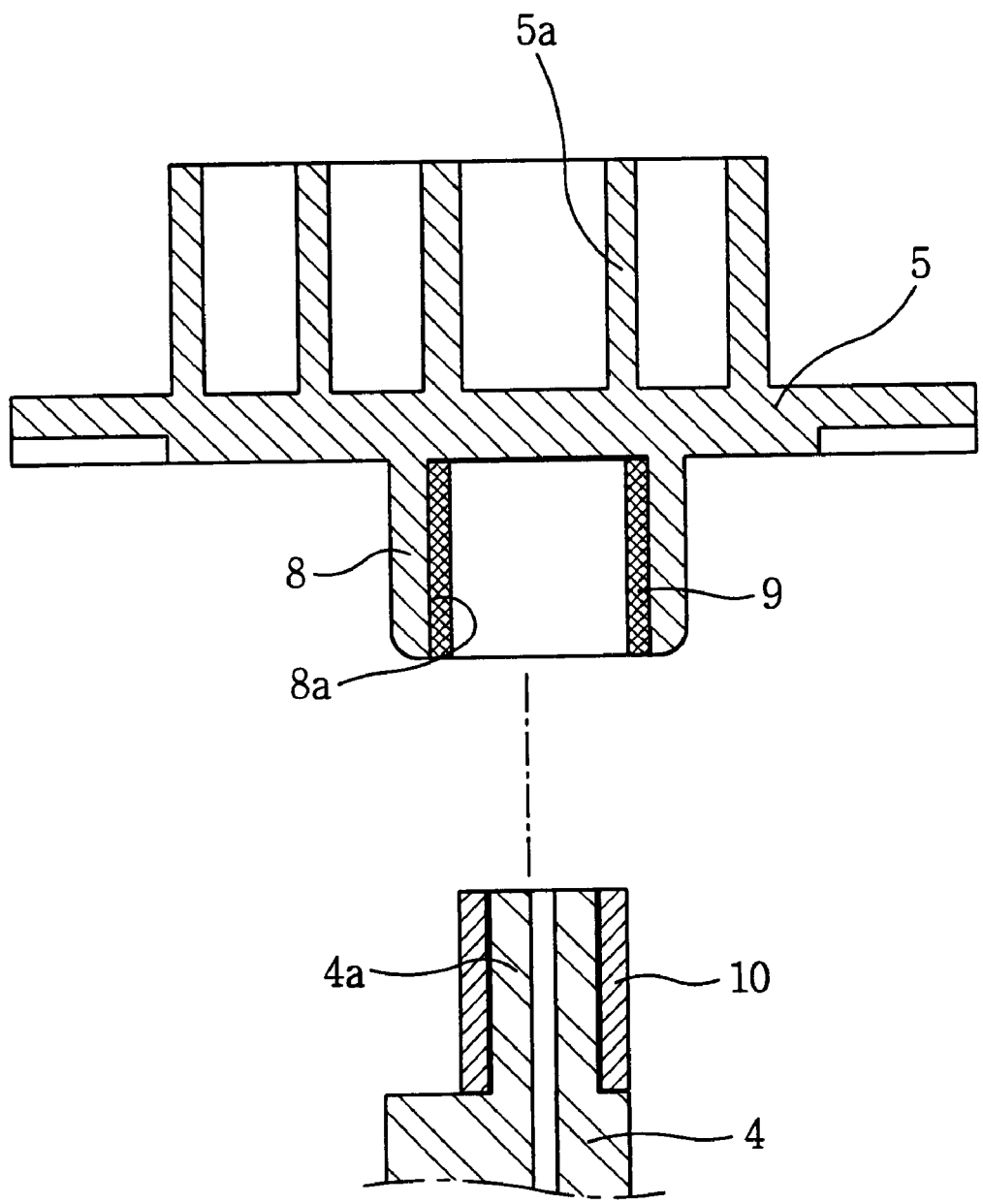
FIG. 2 is a longitudinal cross-sectional view illustrating coupling of an orbiting scroll and a rotary shaft of the compressor shown in FIG. 1.
Figure 3:
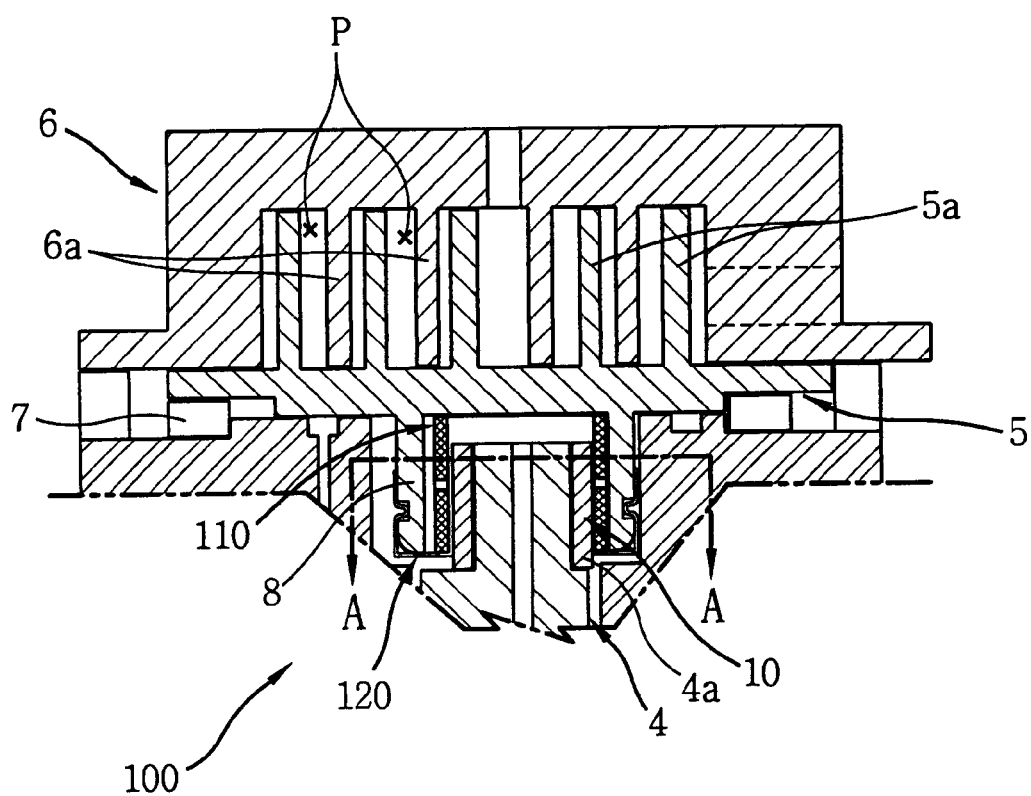
FIG. 3 is a longitudinal cross-sectional view showing an apparatus for reducing friction loss of a scroll compressor according to an embodiment of the present invention.
Figure 4:
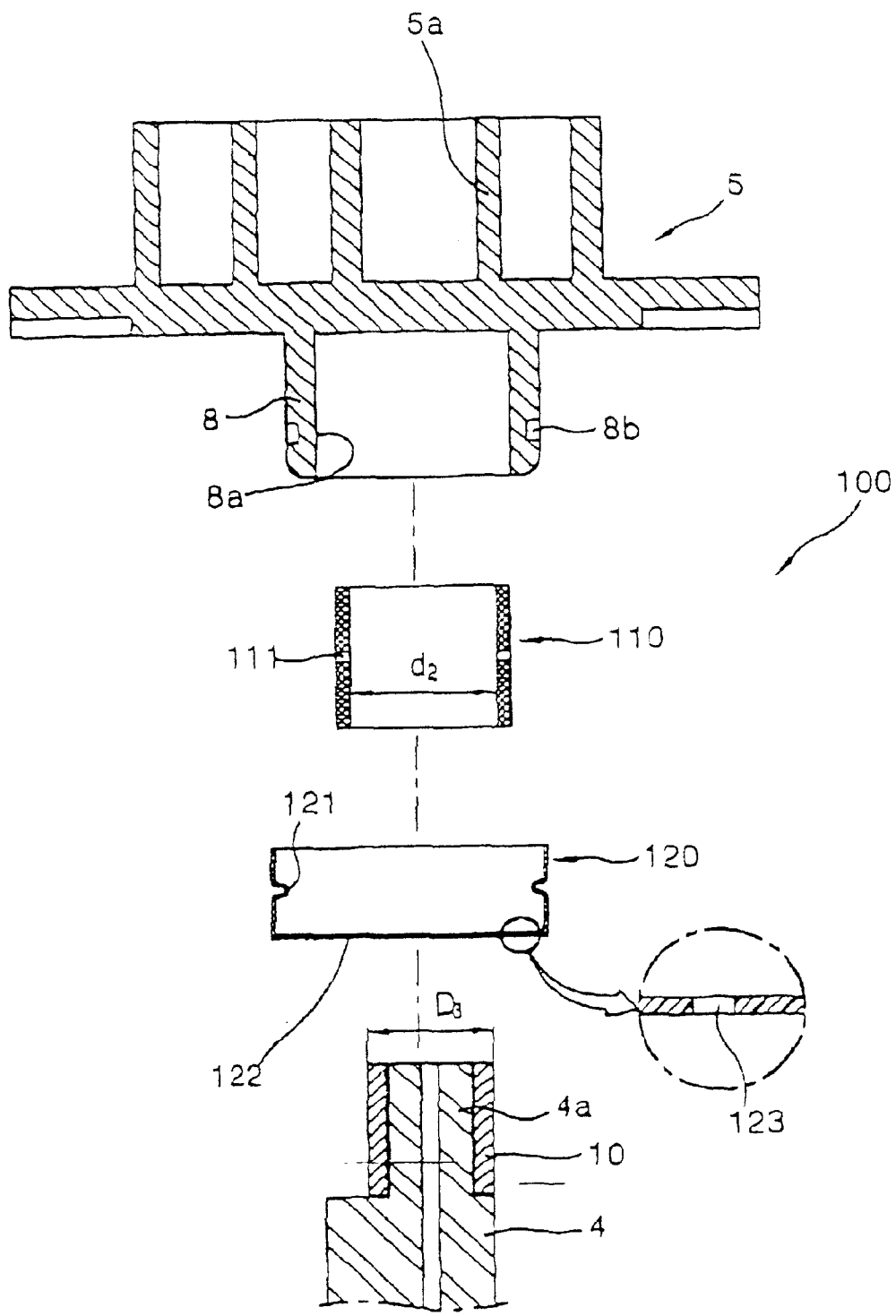
FIG. 4 is a view illustrating coupling of an orbiting scroll and a rotary shaft of the compressor shown in FIG. 3.
Figure 5:
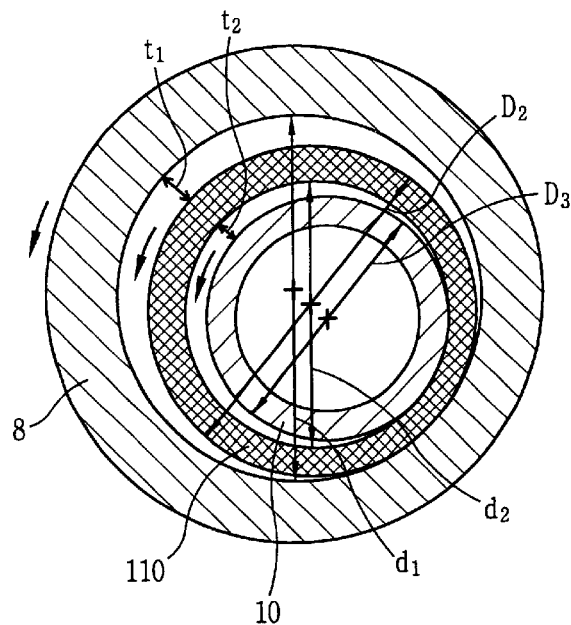
FIG. 5 is a cross-sectional view taken along line A—A in FIG. 3 illustrating operations of a slide bush, a floating ring member and a hub.

FIG. 3 is a longitudinal cross-sectional view showing an apparatus for reducing friction loss in a scroll compressor according to an embodiment of the present invention, FIG. 4 is a view illustrating coupling of an orbiting scroll and a rotary shaft shown in FIG. 3, and FIG. 5 is a cross-sectional view taken along line A—A in FIG. 3 illustrating operations of a slide bush, a floating ring member and a hub.

As shown therein, the scroll compressor according to the present invention includes a fixed scroll 6 fixedly installed in a housing 1, an orbiting scroll 5 coupled to the fixed scroll 6 to form a compression space P therein, and coupled to a rotary shaft 4 of the driving motor 3 in the housing to be eccentrically rotated so as to take-in, compress and discharge gas, and an apparatus for reducing friction loss installed on a coupling portion of the hub of the orbiting scroll 5 and the rotary shaft 4 so as to reduce the friction loss.

In more detail, the orbiting scroll 5 installed on an upper end of the rotary shaft 4 to be eccentrically rotated has a wrap 5a of involute curve shape thereon, and the fixed scroll 6 coupled to the orbiting scroll 5 has a wrap 6a of involute curve shape on lower part thereof.

In the apparatus for reducing the friction loss 100 according to an embodiment of the present invention, a floating ring member 110 is inserted into an insertion recess 8a of the hub 8 formed on a lower part of the orbiting scroll 5 so as to be rotated and revolved, and a supporting ring member 120 is installed on a lower part of the floating ring member 110 so that the floating ring member 110 cannot escape from the insertion recess 8a.

That is, a mounting protrusion 121 is formed on side surface of the supporting ring member 120 so as to be coupled to a mounting recess 8b formed on an outer circumferential surface of the hub 8.

The mounting protrusion 121 may be separately formed and secured on a side surface of the supporting ring member 120. However, it is desirable that the mounting protrusion 121 is formed integrally with the supporting ring member 120 from a strength and ease of fabrication points of view.

A slide bush insertion hole 122 is formed on a center of a bottom surface of the supporting ring member 120, and a plurality of oil passage holes 111 are formed on a side surface of the floating ring member 110. Also, a plurality of oil drainage holes 123 are formed on outer portion of the bottom surface of the supporting ring member 120.

The supporting ring member 120 supports the floating ring member 110 upward in a state that it is coupled to the hub 8 to be separable, and the slide bush 10 fixed on the eccentric portion 4a of the rotary shaft 4 is inserted into the slide bush insertion hole 122 formed on the center of the floating ring member 110.

An inner diameter d1 (FIG. 5) of the hub is larger than an outer diameter D2 of the floating ring member 110, and thereby, a clearance t1 is formed between the hub 8 and the floating ring member 110. And, an inner diameter d2 of the floating ring member is larger than an outer diameter D3 of the slide bush, and thereby a clearance t2 is formed between the floating ring member 110 and the slide bush 10.

In the clearances t1 and t2, the oil is always contained, and the oil is moved through the oil through hole 111 and drained through the oil drainage hole 123.

The supporting ring member 120 should have a strength or intensity by which the floating ring member 110 is sufficiently supported. Therefore, it is desirable that the supporting ring member 110 is formed using sintered alloy or high strength plastic material.

Also, operational relations among the slide bush, the floating ring member and the hub in rotation of the rotary shaft will be described as follows with reference to FIG. 5.

As shown therein, the floating ring member 110 is located in the insertion recess 8a of the hub 8, and the slide bush 10 is located in the floating ring member 110.

In above status, when the rotary shaft 4 is rotated counter-clockwise centering around a center line thereof, the eccentric portion 4a rotates eccentrically, and at that time, the slide bush 10 is also rotated counter-clockwise and slid along with the inner diameter d2 of the floating ring member.

At that time, the first clearance t1 is formed between the hub 8 and the floating ring member 110, and the second clearance t2 is formed between the floating ring member 110 and the slide bush 10. In addition, since the oil fills the area between the first clearance t1 and in the second clearance t2, the floating ring member 110 is also rotated counter-clockwise with a time delay when the eccentric portion 4a is rotated counter-clockwise, and revolves along with the inner wall of the hub 8. At that time, the hub 8 is also rotated counter-clockwise.

Figure 6:
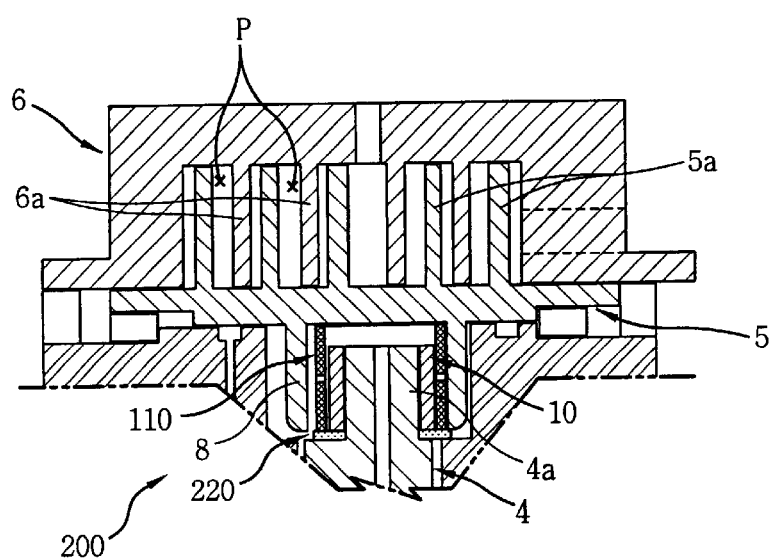
FIG. 6 is a longitudinal cross-sectional view showing an apparatus for reducing friction loss of a scroll compressor according to another embodiment of the present invention.

On the other hand, FIG. 6 is a longitudinal cross-sectional view showing an apparatus that reduces friction loss in a scroll compressor according to another embodiment of the present invention.

As shown therein, in the apparatus that reduces friction loss 200 according to another embodiment, the supporting ring member 220 may be installed on an upper end of the rotary shaft 4.

Hereinafter, operations and effects of the apparatus that reduces friction loss in the scroll compressor according to the present invention will be described as follows.

Referring to FIG. 3, the orbiting scroll 5 takes-in the gas on suction side, compresses the gas in the compression space P, and discharges the gas to the discharge area while being rotated by the driving motor 3.

In transmitting the rotating force of the rotary shaft 4 in the motor 3 to the orbiting scroll 5, when the rotary shaft 4 is rotated counter-clockwise centering around the center line thereof, the eccentric portion 4a and the slide bush 10 are eccentrically rotated counter-clockwise and slid along with the inner diameter of the floating ring member 110.

At that time, the first clearance t1 is formed between the hub 8 and the floating ring member 110, and the second clearance t2 is formed between the floating ring member 110 and the slide bush 10. In addition, since the oil is filled between the first clearance t1 and the second clearance t2, the floating ring member 110 is rotated counter-clockwise with a time delay when the eccentric portion 4a is rotated counter-clockwise, and revolved along with the inner wall of the hub 8. At that time, the hub 8 is also rotated counter-clockwise.

The floating ring member 110 moves in relation to the slide bush 10 in the state of being located between the hub 8 and the slide bush 10 to counteract the friction force and to weaken the friction force, and the floating ring member 110 reduces the rotating speed of the rotary shaft 4 and transmits it to the orbiting scroll 5.

Therefore, because the rotating speed transmitted from the rotary shaft 4 by the floating ring member 110 is not transmitted as it is to the orbiting scroll 5, the rotating speed is lowered to reduce the friction loss.

As described above, according to the present invention, the friction loss and component abrasion generated during transmission of the rotating force of the driving motor to the orbiting scroll can be minimized. Also, the worn components can be replaced easily because the supporting ring member is configured to be separably coupled to the hub to retain the floating ring member.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus that reduces friction loss in a scroll compressor comprising:

a floating ring member positioned in an insertion recess of a hub provided on a lower part of an orbiting scroll to be rotated;

a slide bush fixed on an eccentric portion of a rotary shaft and located in a center of the floating ring member; and a supporting ring member provided on a lower part of the floating ring member so as to prevent the floating ring member from being separated from the insertion recess.

2. The apparatus of claim 1, further comprising a mounting protrusion provided on a side surface of the supporting ring member, so as to enable coupling of the supporting ring member to a mounting recess provided on an outer circumferential surface of the hub.

3. The apparatus of claim 1, wherein the supporting ring member has a slide bush insertion hole on a center of a bottom surface thereof.

4. The apparatus of claim 1, wherein the supporting ring member has a plurality of oil drainage holes on an outer portion thereof.

5. The apparatus of claim 1, wherein the supporting ring member is positioned on an upper portion of the rotary shaft.

6. The apparatus of claim 1, wherein the supporting ring member comprises a sintered alloy.

7. The apparatus of claim 1, wherein the supporting ring member comprises a plastic member.

8. The apparatus of claim 1, wherein an oil passage hole is provided on a side surface of the floating ring member.

9. The apparatus of claim 1, wherein a first clearance is provided between the hub and the floating ring member, and a second clearance is provided between the floating ring member and the slide bush.

10. The apparatus of claim 9, wherein oil is provided between the first clearance and the second clearance.

11. An apparatus for reducing friction loss in a scroll compressor comprising:

a floating ring member positioned in an insertion recess of a hub provided on a lower part of an orbiting scroll to be rotated;

a slide bush fixed on an eccentric portion of a rotary shaft and located in a center part of the floating ring member; and an oil through hole provided in a side surface of the floating ring member.

12. The apparatus of claim 11, wherein a supporting ring member is positioned on a lower part of the floating ring member so as to prevent the floating ring member from being separated from the insertion recess.

13. The apparatus of claim 11, wherein a mounting protrusion is provided on a side surface of the supporting ring member so as to be coupled to a mounting recess provided on an outer circumferential surface of the hub.

14. The apparatus of claim 11, wherein the supporting ring member has a slide bush insertion hole in a center of a bottom surface thereof.

15. The apparatus of claim 11, wherein the supporting ring member has a plurality of oil drainage holes on an outer portion thereof.

16. The apparatus of claim 11, wherein the supporting ring member is positioned on an upper end of the rotary shaft.

17. The apparatus of claim 11, wherein the supporting ring member comprises a sintered alloy.

18. The apparatus of claim 11, wherein the supporting ring member comprises a plastic member.

19. The apparatus of claim 11, wherein an inner diameter of the floating ring member is larger than an outer diameter of the slide bush.

20. The apparatus of claim 11, wherein an outer diameter of the floating ring member is smaller than an inner diameter of the hub.

21. The apparatus of claim 11, wherein a first clearance is provided between the hub and the floating ring member, and a second clearance is provided between the floating ring member and the slide bush.

22. The apparatus of claim 21, wherein oil is provided between the first clearance and the second clearance.

* * * * *